(12) United States Patent
Kim

(10) Patent No.: US 12,333,504 B2
(45) Date of Patent: *Jun. 17, 2025

(54) SYSTEMS AND METHODS FOR ITEM MANAGEMENT

(71) Applicant: QUANATA, LLC, San Francisco, CA (US)

(72) Inventor: Michael Sungjun Kim, Fairfax, VA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,930

(22) Filed: Mar. 25, 2024

(65) Prior Publication Data

US 2024/0232821 A1 Jul. 11, 2024

Related U.S. Application Data

(63) Continuation of application No. 16/776,835, filed on Jan. 30, 2020, now Pat. No. 11,948,130.

(51) Int. Cl.
*G06Q 10/30* (2023.01)
*G06F 18/24* (2023.01)
(Continued)

(52) U.S. Cl.
CPC ............. *G06Q 10/30* (2013.01); *G06F 18/24* (2023.01); *G06N 3/044* (2023.01); *G06N 3/08* (2013.01);
(Continued)

(58) Field of Classification Search
CPC ....... G06Q 10/30; H04N 13/25; G06K 9/6267
(Continued)

(56) References Cited

U.S. PATENT DOCUMENTS 9,573,167 B2 2/2017 Marrapodi et al.
2004/0181422 A1* 9/2004 Brand .................... G06Q 10/30
705/308

(Continued)

FOREIGN PATENT DOCUMENTS

WO 2019000929 1/2019
WO 2019056102 3/2019
WO 2019089825 5/2019

*Primary Examiner* — Jeffery A Williams
(74) *Attorney, Agent, or Firm* — BRYAN CAVE LEIGHTON PAISNER LLP

(57) ABSTRACT

An apparatus including one or more cameras, a deposit region, one or more processors, and one or more non-transitory computer-readable media storing computing instructions that, when executed on the one or more processors, cause the one or more processors to perform certain operations. The operations include receiving image data of one or more items inserted into the deposit region by a user, the image data captured by the one or more cameras when the one or more items are in the deposit region. The operations also include classifying the one or more items as one or more types based at least on the image data. The operations additionally include determining a compensation offer based at least on the one or more types of the one or more items. The operations further include presenting the compensation offer to the user. The operations additionally include, when the user accepts the compensation offer, compensating the user according to the compensation offer. The operations further include, when the user declines the compensation offer and chooses to dispose the one or more items, disposing the one or more items. Other embodiments are described.

20 Claims, 7 Drawing Sheets

(51) Int. Cl.

| | |
|---|---|
| *G06K 9/62* | (2022.01) |
| *G06N 3/044* | (2023.01) |
| *G06N 3/08* | (2023.01) |
| *G06Q 30/0208* | (2023.01) |
| *G06V 40/70* | (2022.01) |
| *H04N 13/25* | (2018.01) |
| *G06F 18/214* | (2023.01) |
| *G06Q 20/06* | (2012.01) |

(52) U.S. Cl.
CPC ......... *G06Q 30/0208* (2013.01); *G06V 40/70* (2022.01); *H04N 13/25* (2018.05); *G06F 18/214* (2023.01); *G06Q 20/065* (2013.01); *G06Q 2220/00* (2013.01)

(58) Field of Classification Search
USPC .......................................................... 705/803
See application file for complete search history.

(56) References Cited

U.S. PATENT DOCUMENTS

| | | | |
|---|---|---|---|
| 2014/0337191 A1* | 11/2014 | Senser | G06Q 10/30 705/35 |
| 2016/0078414 A1 | 3/2016 | Rathore et al. | |
| 2017/0017862 A1 | 1/2017 | Konishi | |
| 2017/0099200 A1* | 4/2017 | Ellenbogen | G06V 10/764 |
| 2019/0017863 A1* | 1/2019 | Saltzman | G06Q 20/065 |
| 2020/0279383 A1 | 9/2020 | Kurtoglu et al. | |

\* cited by examiner

SYSTEMS AND METHODS FOR ITEM MANAGEMENT

CROSS-REFERENCE TO RELATED APPLICATIONS

This application is a continuation of U.S. patent application Ser. No. 16/776,835, filed Jan. 30, 2020. U.S. patent application Ser. No. 16/776,835 is incorporated herein by reference in its entirety.

TECHNICAL FIELD

The present disclosure relates to efficient waste management and, more particularly, to systems and methods for classifying trashed items using a recurrent convolutional neural network with stereo video input and payment of rewards based at least in part upon market and/or social value of the trashed items.

BACKGROUND

Large cities often have waste management problems. People living in such large cities generate large quantities of waste, and these same cities pay large sums of money to handle and dispose of said waste. It is an unending problem. At least some waste has a market value, but it also has a negative social value. As of 2015, the U.S. EPA estimated that the U.S. alone generated 262 million tons of garbage, 91 tons of which were recycled and/or composted.

Human behavior plays a vital role in keeping a community clean. Providing a safe and healthy environment is often a primary goal of any city, borough, or town. Maintaining a clean environment is often left to city governments having to allocate funds to pay city maintenance workers to clean and maintain city streets, parks, sidewalks, and other public areas; and fund advertising campaigns to educate the public about the harmfulness to a community by way of littering. People often litter for a myriad of reasons, such as: they do not feel responsible for public areas; they have developed the habit of littering; they believe someone else will pick up after them, such a maintenance worker or the like; people feel less responsible or guilty about littering when litter has piled up; and lack of trash receptacles, among other reasons. The cleaner a community is, the less likely people are to actually litter. Developing a culture of cleanliness and influence a community of citizens to pick up after themselves, or others, is a daunting task for any city or community.

Current public trash receptacles may include different openings for different types of waste, such as aluminum, glass, plastic, paper, compost, and general trash. While the labeling of waste bin openings is helpful, there lacks any incentive for depositing waste into the correct opening. Further, whether intentional or not, the placement of a certain type of trash into the wrong receptacle, such as glass into the paper slot, requires undue burden on behalf of a waste management company to correct the misfiling. Due to human error or negligence, waste management companies are responsible for the hiring of workers to sift through and properly sort garbage into its correct classifications.

Some states incentivize the removal of litter by providing cash refunds for waste, such as the passing of beverage container laws in Connecticut and Hawaii, which provide a five cent refund for recyclable containers (e.g., aluminum cans, water bottles). The financial benefit for the exchange of recyclable goods is therefore extremely small and not seen as worth the effort by many.

While certain types of waste, such as aluminum cans, may have a certain market value, other types of waste may have a significant negative social value with little or no market value. Most, if not all, types of waste have at least some kind of negative social value associated with them. However, not all types of waste have the same amount of negative social value assigned to them. For example, aluminum cans may have a small market value and a relatively small negative social value. In comparison, used drug needles or syringes have a high negative social value, not only due to the fact that they are unsightly, but they may also aid in the spread of disease. Solutions are needed to motivate the public to properly dispose of used needles or syringes, especially in communities where clean syringes are distributed with the intent to protect public health.

Accordingly, a single "smart" trash receptacle configured to manage needles, recyclables, compost, and burnable trash could have much value, resulting in cleaner city streets and a motivated population to properly dispose of refuse.

BRIEF SUMMARY

The present embodiments may relate to a waste management system that uses recurrent convolutional neural networks in combination with a video input to properly classify waste products disposed of in a "smart waste bin." The smart waste bin may also pay or reward a disposer for disposing of such waste products. Waste products may include any type of trash, litter, refuse, compost, recyclable materials, bio-degradable materials, or needles, among other types of waste. Trashed items (e.g., waste products disposed of in the smart waste bin) may be captured by one or more camera devices or even mobile device cameras when placed or disposed of in the smart waste bin. The captured images provide input to waste classification models that are configured to identify and sort the trashed items. Even further, a value of the trashed items may be computed based upon a myriad of different factors, such as weight, mass, volume, condition, market value, and social value. In response to an actual value being placed on the trashed item, an individual that presented the trashed item may be compensated in exchange for proper disposal of the trashed item. Payment to the individual may be made in cash, digital payment, or via a cryptocurrency payment. A computing device in communication with and/or coupled to the smart waste bin may be configured to use machine learning techniques and stereo video input to scan, record, and analyze, using multiple cameras, trashed items placed in a receiving location within the smart waste bin. In some cases, the cameras associated with the smart waste bin may also capture pictures of the person depositing the trashed items for record keeping purposes.

In one aspect, a smart waste bin for waste management including a plurality of cameras, a deposit container, a plurality of waste receptacles, and a computing device including at least one processor in communication with at least one memory device may be provided. The at least one processor may be configured to: (i) receive image data of one or more items inserted into the deposit container by a user, the image data captured by at least one camera of the plurality of cameras, (ii) receive user data associated with the user, (iii) classify the one or more items based upon the image data, (iv) sort the one or more items into the corresponding waste receptacle of the plurality of waste receptacles based upon the classification, (v) determine an assigned value of the one or more items based upon the classification, and (vi) compensate the user based upon the assigned value of the one or more items. The smart waste bin may include additional, less, or alternate functionality, including that discussed elsewhere herein.

In another aspect, a method for waste management carried out via a smart waste bin, the smart waste bin including a plurality of cameras, a plurality of waste receptacles, and a deposit container, may be provided. The method may include: (i) receiving image data of one or more items inserted into the deposit container by a user, the image data captured by at least one camera of the plurality of cameras, (ii) receiving user data associated with the user, (iii) classifying the one or more items based upon the image data, (iv) sorting the one or more items into the corresponding waste receptacle of the plurality of waste receptacles based upon the classification, (v) determining an assigned value of the one or more items based upon the classification, and (vi) compensating the user based upon the assigned value of the one or more items. The method may include additional, less, or alternate actions, including that discussed elsewhere herein.

In yet another aspect, at least one non-transitory computer-readable media having computer-executable instructions thereon, wherein when executed by at least one processor of a computer system of a smart waste bin including a plurality of cameras, a deposit container, and a plurality of receptacles, cause the at least one processor to: (i) receive image data of one or more items inserted into the deposit container by a user, the image data captured by at least one camera of the plurality of cameras, (ii) receive user data associated with the user, (iii) classify the one or more items based upon the image data, (iv) sort the one or more items into the corresponding waste receptacle of the plurality of waste receptacles based upon the classification, (v) determine an assigned value of the one or more items based upon the classification, and (vi) compensate the user based upon the assigned value of the one or more items. The instructions may direct additional, less, or alternate functionality, including that discussed elsewhere herein.

In yet another aspect, an apparatus includes one or more cameras, a deposit region, one or more processors, and one or more non-transitory computer-readable media storing computing instructions that, when executed on the one or more processors, cause the one or more processors to perform certain operations. The operations include receiving image data of one or more items inserted into the deposit region by a user, the image data captured by the one or more cameras when the one or more items are in the deposit region. The operations also include classifying the one or more items as one or more types based at least on the image data. The operations additionally include determining a compensation offer based at least on the one or more types of the one or more items. The operations further include presenting the compensation offer to the user. The operations additionally include, when the user accepts the compensation offer, compensating the user according to the compensation offer.

In yet another aspect, a computer-implemented method includes receiving image data of one or more items inserted into a deposit region by a user, the image data captured by one or more cameras when the one or more items are in the deposit region. The method also includes classifying the one or more items as one or more types based at least on the image data. The method additionally includes determining a compensation offer based at least on the one or more types of the one or more items. The method further includes presenting the compensation offer to the user. The method additionally includes, when the user accepts the compensation offer, compensating the user according to the compensation offer. The method further includes, when the user declines the compensation offer and chooses to dispose the one or more items, disposing the one or more items.

In yet another aspect, one or more non-transitory computer-readable media includes computing instructions that, when executed on one or more processors, cause the one or more processors to perform certain operations. The operations include receiving image data of one or more items inserted into a deposit region by a user, the image data captured by one or more cameras when the one or more items are in the deposit region. The operations also include classifying the one or more items as one or more types based at least on the image data. The operations additionally include determining a compensation offer based at least on the one or more types of the one or more items. The operations further include presenting the compensation offer to the user. The operations additionally include, when the user accepts the compensation offer, compensating the user according to the compensation offer. The operations further include, when the user declines the compensation offer and chooses to dispose the one or more items, disposing the one or more items.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
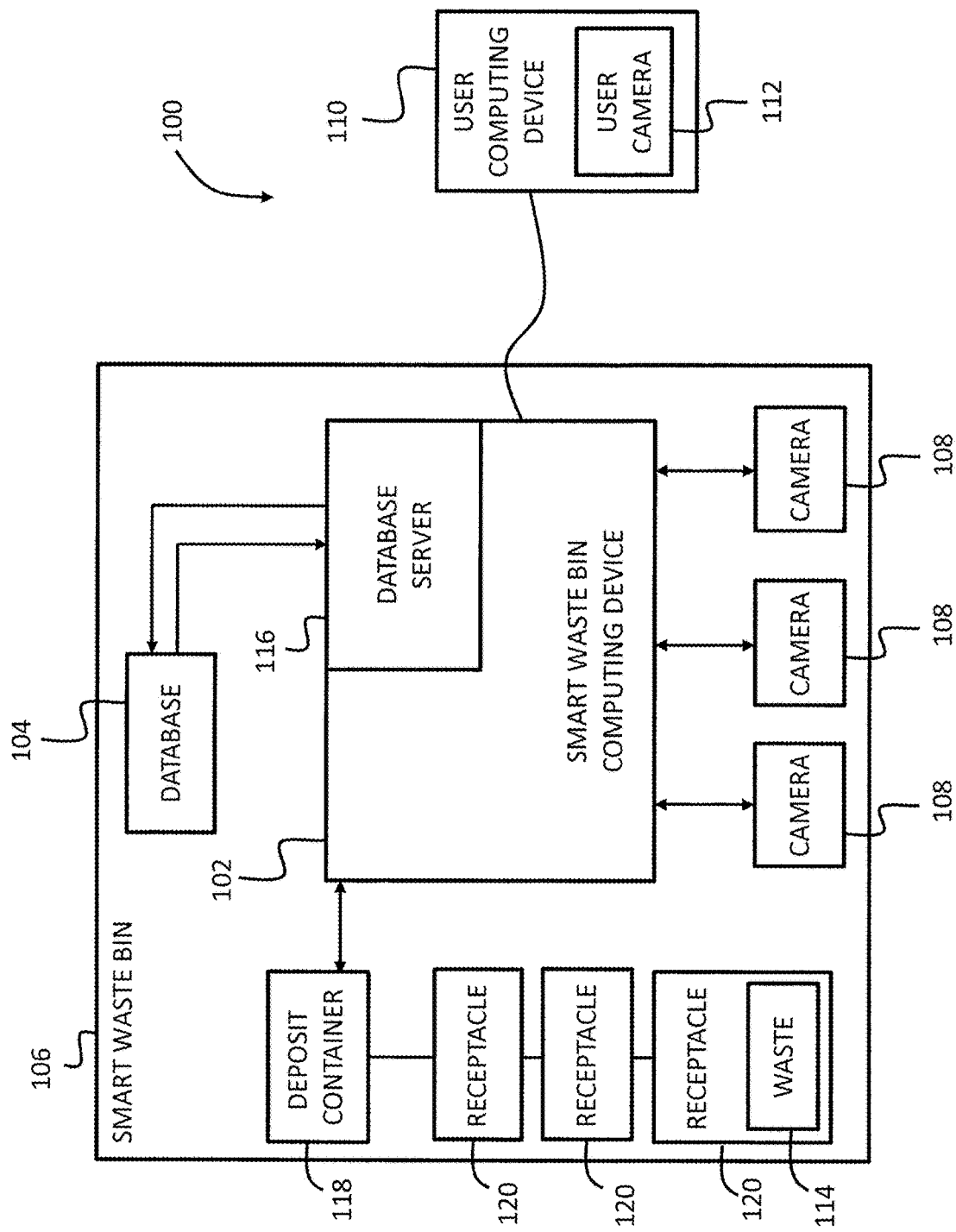
FIG. 1 illustrates an exemplary smart waste bin computer system for waste management in accordance with the present disclosure.

The Figures depict preferred embodiments for purposes of illustration only. One skilled in the art will readily recognize from the following discussion that alternative embodiments of the systems and methods illustrated herein may be employed without departing from the principles of the embodiments described herein.

DETAILED DESCRIPTION OF THE DRAWINGS

The present embodiments may relate to, inter alia, systems and methods for waste management (e.g., using waste classification models to identify and sort one or more trashed items and provide financial compensation for a user who deposits the trashed items). In one exemplary embodiment, the methods may be performed by a smart waste bin computing device (also referred to herein as a "smart waste bin server" and a "smart waste bin computer device") included in a smart waste bin system. The smart waste bin system may further include a smart waste bin including the smart waste bin computing device, a deposit container, a plurality of receptacles, and a plurality of cameras.

The systems and methods described herein may leverage stereo video recurrent convolutional neural networks for waste management and providing financial compensation for trashed items. The smart waste bin may use machine learning (e.g., recurrent convolutional neural networks and regression) based upon computer vision systems input, such as input related to a trashed item (e.g., any type of item presented for disposal, including, but not limited to, trash, waste, litter, refuse, compost, recyclables, organic materials, etc.) and may pay out rewards to a user in exchange for the trashed item. Computer vision systems may include two or more cameras allowing for stereo video and 3-D computer vision. Alternatively, the smart waste bin may use single cameras (e.g., a camera of a mobile device of a user) as an image input. Recurrent convolutional neural networks may process stereo video streams and/or image inputs and perform binary classification and regression. Binary classification may categorize the trashed item (e.g., as general waste, recyclable aluminum, recyclable plastic, a needle, compost, etc.), and regression methods may compute a dynamic payout based upon a market value and/or a social value of the trashed item. Once a value is determined for the trashed item, an offer may be made to the user (e.g., via a user interface and/or a message sent to the personal device of the user). If the offer is accepted, the dynamic payout may be made to the user, and the dynamic payout may include a cash payment, digital payment, and/or a cryptocurrency payment.

Further, the systems and methods described herein may include sorting the trashed items into corresponding receptacles of the smart waste bin after the user has received the reward for the trashed items. The smart waste bin may determine the appropriate receptacle to sort the trashed items into based upon the classification of the trashed items. For example, the smart waste bin may sort a trashed item classified as compost to a compost receptacle.

As described below, systems and methods described herein provide financial reimbursement to users for depositing the trashed items into the smart waste bin. Financial reimbursement may include cash payments, debit and/or credit payments (e.g., reloadable debit cards, gift cards, and credit card account credits), online payments (e.g., PayPal®, Venmo®, etc.), and/or cryptocurrency payments (e.g., Bitcoin, ETHEREUM, etc.).

At least one of the problems addressed by the disclosed systems and methods may include: (i) improper disposal of waste, such as recyclable materials mixed in with compost, compost thrown into a waste bin slot intended for aluminum cans, etc., (ii) the disposal of organic materials, such as stones, soil, or the like clogging compost and/or recycling centers, (iii) a negative social value of waste, such as litter, used needles, or rotting food that is not disposed of (e.g., waste left on streets, on sidewalks, in parks, etc.), (iv) disease spread by the improper disposal of waste, and/or (v) the high cost that cities have to pay for waste management.

At least one of the solutions associated with the disclosed systems and methods include: (i) providing a smart waste bin that automatically and correctly sorts waste, (ii) providing incentives for users to dispose of waste into the smart waste bin, and (iii) using the smart waste bin to encourage proper waste disposal for users (e.g., residents of a city), such that burden of waste management may be distributed between residents and the city.

The disclosed systems and methods may carry out the solutions at least through: (i) receiving image data of one or more items inserted into the deposit container by a user, the image data captured by at least one camera of the plurality of cameras, (ii) receiving user data associated with the user, (iii) classifying the one or more items based upon the image data, (iv) sorting the one or more items into the corresponding waste receptacle of the plurality of waste receptacles based upon the classification, (v) determining an assigned value of the one or more items based upon the classification, (vi) compensating the user based upon the assigned value of the one or more items, and (vii) retraining (e.g., based upon new data and human updates) the waste classification model to ensure that people do not game the system (e.g., receive rewards for items that do not have social or market value).

Examples of Initializing a Database Associated with a Smart Waste Bin

In the exemplary embodiment, the smart waste bin may include a smart waste bin computing device, and the smart waste bin commuting device may be communicatively coupled to a database. The database may have stored thereon information that may be vital to the operation of the smart waste bin system. The database, either stored locally, remotely, or accessible via a cloud storage option, may store, for example, user information (e.g., user account information including username, password, credentials, alias name, address, phone number, unique user identifier, payment account information, etc. and depositing history), item information (e.g., item characteristics), classification information (e.g., related to classifying identified items and/or prior classification data), and valuation information (e.g., social and market values for the items). The database may also have stored thereon the location of each smart waste bin in a network of smart waste bins.

The machine learning methods and waste classification models may use and/or add to the database. For example, the database may store trashed items that were previously manually classified by human users, and the machine learning methods and waste classification models may use the manually classified trashed items as a training set to build a model that automatically classifies trashed items. Further, for example, the models may be stored on the database to be used by the smart waste bin computing device.

Examples of Authenticating a User at a Disposal Device

In the exemplary embodiment, the smart waste bin system may receive (e.g., via a deposit container), a trashed item presented for classification and reward from a user. As described herein, a single user may be described as interacting with the smart waste bin. However, it is understood that more than one user may be responsible for presenting an item, or a plurality of items, for classification. A user may be associated with a user device, such as a mobile device, utilized to interact with the smart waste bin (e.g., through a smart waste bin computing device of the smart waste bin). In some embodiments, the smart waste bin computing device may automatically detect, identify, and authenticate a user via their mobile device once the user is within a close proximity (e.g., 10 feet or less) of the smart waste bin.

In some embodiments, the user device may have stored thereon a smart waste bin application associated with the smart waste bin computing device. In other embodiments, the smart waste bin computing device may be configured to communicate with the user device. The user device may be equipped with, for example, global positioning system (GPS) functionality through a GPS device. The GPS device may utilize GPS techniques to determine geographic coordinates of the user device. Using the measured geographic location of the user, the user device may display to the user (e.g., through a user interface) where nearby smart waste bins are located. The user device may also be equipped with near-field communications (NFC) which may permit the user device, when in close communication with the smart waste bin, to exchange information wirelessly. Exchanged information may include data authenticating the user for processing by the smart waste bin computing device. If the user is not recognized, the user may be presented with the option to create a new user account with the smart waste bin computing device. The creation of a user account may not be a need for the smart waste bin computing device to be operable by a user. For example, a user may choose to interact with the smart waste bin anonymously.

A disposal computing device may be equipped with one or more external cameras utilized to detect, for example via motion, an oncoming user. The one or more cameras may be placed into a low energy state, or sleep mode, until motion is detected. A user may be authenticated by the smart waste bin in a variety of different ways. For example, the smart waste bin may use facial recognition, NFC communications from the user device, log-in information input to a screen presented on the smart waste bin, scanned badge information of the user, NFC tags, barcodes, QR codes, etc. to authenticate a user such that the user may deposit the trashed item into the smart waste bin and be correctly rewarded (e.g., based upon preferences input by the user into the authenticated user account). In some embodiments, users may decide to proceed without being authenticated by the smart waste bin. For example, users may continue as a guest and the smart waste bin may use default settings (e.g., a cash or change reward) to reward the user for the trashed item.

Examples of Identifying an Item at the Disposal Device

In the exemplary embodiment, the smart waste bin computing device may determine that a trashed item has been presented for disposal by one or more users. Once it is determined that an item has been presented, different characteristics of the trashed item may be determined. The different characteristics may include, for example, shape, mass, weight, color, condition, recyclability, material, etc. The smart waste bin may be equipped with one or more sensors for gathering characteristics of the trashed items. These sensors may include cameras to capture visual data of the trashed item, including 2-D and 3-D cameras for modeling purposes. Other sensors may include, for example, a scale to determine a weight of the item. The smart waste bin computing device may process the different characteristics of the trashed item to identify the trashed item.

In the exemplary embodiment, the smart waste bin computing device may generate and store (e.g., in a database associated with the smart waste bin) waste classification models configured to identify and sort trashed items deposited in the smart waste bin. The waste classification models may be generated by the smart waste bin computing device using machine learning and more specifically, recurrent convolutional neural networks. To generate the waste classification model, the smart waste bin computing device may first prompt users (e.g., through the user device and/or through a user interface of the smart waste bin) to identify the trashed items once the smart waste bin computing device has determined the characteristics of the trashed item. For example, a user may input that the trashed item is a plastic bottle that may be recycled, needles that may be placed in a sharps container, newspapers that may be recycled, or compostable food that may be composted. The smart waste bin computing device may use recurrent convolutional neural networks to associate the determined characteristics of the trashed items to the identity of the item. Once the smart waste bin computing device receives enough user input to generate a statistically sound waste classification model (e.g., where the model correctly identifies the trashed item 90% of the time), the smart waste bin computing device may automatically (e.g., without user input) identify the items. The smart waste bin computing device may continue receiving user feedback (e.g., prompting the user to input if the identity of the trashed item is correct) such that the smart waste bin computing device may dynamically and continuously update the waste classification models. Further, the smart waste bin computing device may be configured to update the waste classification models and associated data through software and/or firmware updates (e.g., via Wi-Fi or other online updates). Updates to the classification models of the smart waste bin computing device may ensure that users do not game the system (e.g., by placing items in the smart waste bin that do not have any value like organic materials or other non-trash items).

In some embodiments, the user device may be used to upload data pertaining to the trashed item (e.g., through the smart waste bin application). The smart waste bin application may control one or more cameras of the user device to capture images of the trashed item. The image data may then be loaded onto the smart waste bin computing device for further processing, such as item identification.

Examples of Valuing an Item at the Disposal Device

In some embodiments, once a trashed item is identified, the trashed item may be further processed for its overall value. This may include a market value, a social value, or a combination of the both. For example, a market value of a recyclable item may be applicable in certain jurisdictions, like recycled aluminum cans being associated with a refund of five cents or stacks of newspapers being associated with a refund of ten cents. While market value determines how much a trashed item may be worth for a refund, the social value of trashing the trashed item may also be important in determining reimbursements for trashed items. For example, even though drug paraphernalia like a syringe or needles (or even syringes used for prescribed drugs) may not be able to be recycled to be used again, the social value of trashing drug paraphernalia may be very high because it is desirable for cities to have public places and streets free of drug paraphernalia. Accordingly, some jurisdictions may reward the trashing of items with social value. The market and social values of the trashed items may be particular to certain jurisdictions, and the smart waste bin computing device may store the market and social values of trashed items of different jurisdictions in the database associated with the smart waste bin computing device.

In some embodiments, a trashed item may have a social value and a market value, generally hinging on the need to remove such an item from the streets (e.g., social value) and the reusability, recyclability, or repurposing of the actual item (e.g., market value). The smart waste bin computing device may generate and store (e.g., in the database associated with the smart waste bin computing device) a value model of identified items. For example, the smart waste bin computing device may use regression to determine an overall value of the trashed item based upon the social value and the market value of the trashed item.

Examples of Financial Reimbursement for an Item

In some embodiments, financial compensation and/or rewards are offered in exchange for the trashing of the trashed item. For example, once it has been determined that a trashed item holds a certain value by the smart waste bin computing device, whether it be a market value or a social value, or a combination of both, the user that presented the item may be reimbursed for the trashed item. For example, the smart waste bin may be coupled to a cash dispenser that dispenses currency. In another example, the smart waste bin computing device may provide reimbursement via an online money exchange platform. The user may have the option to provide their email address or other account information to enable the online transfer of money. The smart waste bin computing device may be partnered with online money exchange platforms to allow seamless and instantaneous transfer of money or value. In yet another example, the disposal computing device may compensate the user in cryptocurrency. In some embodiments, the user may select their desired payment method or have it previously stored in a user account stored by the smart waste bin computing device.

In some embodiments, user account information stored in the database may include user preferences with respect to preferred reimbursement channels. For example, a user may store their email address to be used for the transfer of money or a public address key for the sending of cryptocurrency along with the preferred cryptocurrency type.

In order to be reimbursed in cryptocurrency, a user may need a cryptocurrency wallet (e.g., BTC wallet). A cryptocurrency wallet may be an application that allows a user to receive, hold, and spend the cryptocurrency associated with the user. The cryptocurrency wallet may secure a user account, or cryptocurrency coins, using cryptographic hashing, public keys, and private keys. The cryptocurrency wallet may be represented by a wallet address. In some embodiments, the smart waste bin computing device may use the wallet address to send a certain amount of cryptocurrency to another user. For example, the smart waste bin computing device may have its own wallet that may be used to reward the users. The smart waste bin computing device may be given the address of the user wallet (e.g., via the scanning of a QR code) then send a request on the corresponding cryptocurrency blockchain to send a certain amount of cryptocurrency, equal to the determined trashed item value, from the smart waste bin computing device wallet to the user wallet. The disclosed payment systems are not limited to any certain type of blockchain or cryptocurrency.

In some embodiments, the smart waste bin computing device may determine that the item has no value. For example, certain compostable material or non-recyclable plastic may hold no market or social value. In this instance, the smart waste bin computing device may simply dispose of the trashed item, or alternatively, return the trashed item to the user. In some embodiments, the user may be given the option to have the trashed item returned or disposed of properly.

Examples of Sorting of an Item at the Disposal Device

In some embodiments, a deposit container of the smart waste bin may be coupled to one or more receptacles and may include a sorting mechanism to sort the trashed items into the appropriate receptacles. The smart waste bin computing device may provide instructions to the sorting mechanism to sort the trashed item as determined by the identification of the trashed items. For example, if the smart waste bin computing device identifies the trashed item as a plastic bottle, the smart waste bin computing device may instruct the sorting mechanism to sort the trashed item into the receptacle that corresponds with plastic recycling. Machine sorting, as opposed to manual sorting by the users, eliminates human error of sorting trashed items into incorrect trash/recycling receptacles. For example, the sorting mechanism of the smart waste bin may ensure that each trashed item is placed into the correct receptacle and may eliminate workers at a recycling and/or compost plant needing to sift through trashed items and remove non-recyclable or non-compostable items. In some embodiments, the smart waste bin may sort trashed items for disposal into different receptacles equipped to handle the trashed items properly. For example, an item categorized as biohazard may be sorted into a receptacle able to properly handle such a material.

In the exemplary embodiment, the smart waste bin may include receptacles relating to many different trashed items. For example, the receptacles may include paper recycling, plastic recycling, general trash, compost, biohazards, sharps, etc. The receptacles may be accessed by authorized users (e.g., city workers) to further dispose of the trashed items (e.g., to a recycling plant, a dump, etc.).

Exemplary Computer System

FIG. 1 depicts an exemplary smart waste bin system 100 that may be used in waste management. For example, smart waste bin system 100 may receive, classify, identify, and sort trashed items from a user and reward the user for depositing the trashed items. In the exemplary embodiment, smart waste bin system 100 may include a smart waste bin 106 that may include a smart waste bin computing device 102, one or more cameras 108, a deposit container 118, and one or more receptacles 120.

In the exemplary embodiment, smart waste bin computing device 102 may be communicatively coupled to a database 104. For simplicity, a single database may be shown for database 104, however it is understood that database 104 may comprise a multitude of data storage solutions. Data storage solutions include, but certainly are not limited to, an array of a series of database, cloud storage options accessible via a network, such as the Internet, local data storage options, or other data storage options as known in the art. Smart waste bin computing device 102 may be in communication with database 104 through a database server 116. In some embodiments, database server 116 may be a component of smart waste bin computing device 102. In other embodiments, database server 116 may be separate from smart waste bin computing device 102. Smart waste bin computing device 102 may be coupled to deposit container 118 and cameras 108 and may be in communication with a user computing device 110. Deposit container 118 may be coupled to receptacles 120, and receptacles may include sorted waste 114. In some embodiments, smart waste bin system 100 may include one or more smart waste bins 106, smart waste bin computing devices 102, databases 104, user computing devices 110, deposit containers 118, receptacles 120, and cameras 108.

In the exemplary embodiment, smart waste bin 106 may include cameras 108, deposit container 118, and receptacles 120. Further, smart waste bin 106 may include other sensors (e.g., besides cameras 108) that may include, for example, scales. Cameras 108 may be coupled to deposit container 118. Deposit container 118 may be a container where users may deposit trashed items to be identified and sorted by smart waste bin 106 (e.g., by a sorting mechanism, not shown). Deposit container 118 may be coupled to receptacles 120 used to sort the trashed items. Receptacles 120 may be associated with, for example, paper recycling, plastic recycling, sharps containers, general waste containers, biohazard containers, etc., and receptacles 120 may include waste 114 (e.g., sorted trashed items from the sorting mechanism). In some embodiments, smart waste bin 106 may include one or more buttons or activation switches (not specifically shown) to activate smart waste bin 106. Further, smart waste bin 106 may include a screen, such as a touch screen, that provides a user interface to perform system activation and other functions that may receive user input. The screen may be communicatively coupled to smart waste bin computing device 106, and the screen may be a user interface of smart waste bin 106. In some embodiments, smart waste bin computing device 102 smart waste bin 106 may be associated with, for example, a waste management, classification, identification, and sorting system. Further, smart waste bin computing device 102 smart waste bin 106 may be associated, for example, with a recurrent convolutional neural network utilized to process, record, and analyze recorded stereo imaging video (e.g., from cameras 108).

In the exemplary embodiment, user computing device 110 may be any computer that includes a web browser and/or a software application, which enables user computing device 110 to access remote computer devices, such as smart waste bin computing device 102, using the Internet or other network. More specifically, user computing device 110 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computing device 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. Further, smart waste bin computing device 102 may be communicatively coupled to user computing device 110 and may receive information from user computing device 110. User computing device 110 may be equipped with one or more user cameras 112. User computing device 110 may further be equipped with GPS capabilities, and the GPS capabilities may allow user computing device 110 to determine a measurement of geographic coordinates of user computing device 110. The geographic coordinates of the user computing device 110 may allow a user to determine where they are geographically in relation to smart waste bin 106.

Smart waste bin computing device 102 may receive user identifying data information from a user associated with user computing device 110, via cameras 108, user camera 112, the user interface of smart waste bin computing device 102, or a combination thereof. In some embodiments, smart waste bin computing device 102 may use stereo imaging video to capture and record a user and subsequently perform user identification and authentication. In some embodiments, smart waste bin computing device 102 may perform user identification and authentication using near-field communications (NFC), such as via Bluetooth®. In some embodiments, smart waste bin computing device 102 may perform user identification and authentication using facial recognition techniques based upon images captured via cameras 108 or user camera 112. In some further embodiments, smart waste bin computing device 102 may perform user identification and authentication via the scanning of a user identification card or code, such as a bar code or a QR code, or the like. User data (e.g., personal and preference data input by a user to create a user account) and authentication information may be stored in a database, such as database 104.

Smart waste bin computing device 102, using cameras 108, user camera 112, and/or other sensor associated with smart waste bin 106, may identify trashed items deposited and/or inserted into deposit container 118. A trashed item may be inserted into deposit container 118 of smart waste bin 106. Once inserted, the trashed item may be captured by one or more cameras 108. In some embodiments, cameras 108 may use stereo imaging video capture techniques to create a 3-dimensional (3-D) computer image to capture characteristics of the trashed item. Other sensors of smart waste bin 106 may capture additional characteristics of the trashed item including, for example, mass, weight, and overall condition of the trashed item. Smart waste bin computing device 102 may generate and store (e.g., in database 104) a waste classification model that identifies the trashed items based upon the characteristics (e.g., determined from cameras 108 and other sensors) of the trashed items. For example, smart waste bin computing device 102 may use recurrent convolutional neural networks to generate the waste classification model, and smart waste bin computing device 102 may process characteristics of a trashed item to identify and properly sort the trashed item using the waste classification model. Further, users may input (e.g., via user computing device 110 and/or the user interface of smart waste bin 106) whether smart waste bin computing device 102 correctly identifies trashed items, and smart waste bin computing device 102 may continually update and perfect the waste classification model such that trashed items may be identified correctly such that users are unable to game smart waste bin computing device 102.

Smart waste bin computing device 102 may compute a reward value of the identified trashed item presented for disposal. The reward may be based upon a social value and a market value associated with the trashed item, generally hinging on the need to remove such an item from the streets and/or public places (e.g., social value) and the reusability, recyclability, or repurposing of the trashed item (e.g., market value). In some embodiments, smart waste bin computing device 102 may use regression to compute the reward for the trashed item.

Smart waste bin computing device 102 may identify a user (e.g., a user associated with a stored user account) depositing a trashed item into smart waste bin 106 and/or smart waste bin computing device 102 may determine that a user is not associated with a stored user account. All users who deposit trashed items that have value into smart waste bin 106 are compensated. Smart waste bin computing device 102 may compensate and/or reward users for trashed items with online payment, cryptocurrency payment, direct deposit payments, cash payments, etc. If a user is associated with a user account, smart waste bin computing device 102 may reward the user based upon preferences included in the user account (e.g., user may prefer direct deposit payments over cryptocurrency payments). If a user is not associated with a stored user account, smart waste bin computing device 102 may use default payment methods (e.g., cash payments) to reward the user. For example, in some embodiment, smart waste bin 106 may further include a cash dispensing device (not specifically shown) that may dispense cash at smart waste bin 106 instead of online payments types (e.g., cryptocurrency payments, direct deposit payments, PayPal®, Venmo®, etc.).

In some embodiments, in identifying the trashed items, smart bin computing device 102 may classify the trashed items for sorting and disposal. For example, the trashed items may be subject to binary classification through smart waste bin computing device 102. Binary classification processes may pick a category for the trashed item. In at least one embodiment, the waste item may be classified into a certain category, such as recyclable aluminum, a bio-degradable needle, compost, or the like. In some embodiments, smart waste bin computing device 102 may perform data retrieval from database 104 to perform image comparison. In some embodiments, the image comparison may include multiple comparisons to accurately identify and classify the trashed item. For example, if a user deposits a stack of newspapers into deposit container 118, captured images of the newspaper stack (e.g., from cameras 108) may be compared with different images of newspapers stored in database 104, and smart waste bin computing device 102 may identify the trashed item as newspapers. Smart bin computing device 102 may then instruct deposit container 118 to sort the trashed item into receptacle 120 related to paper recycling.

Exemplary Computing Device

Figure 2:
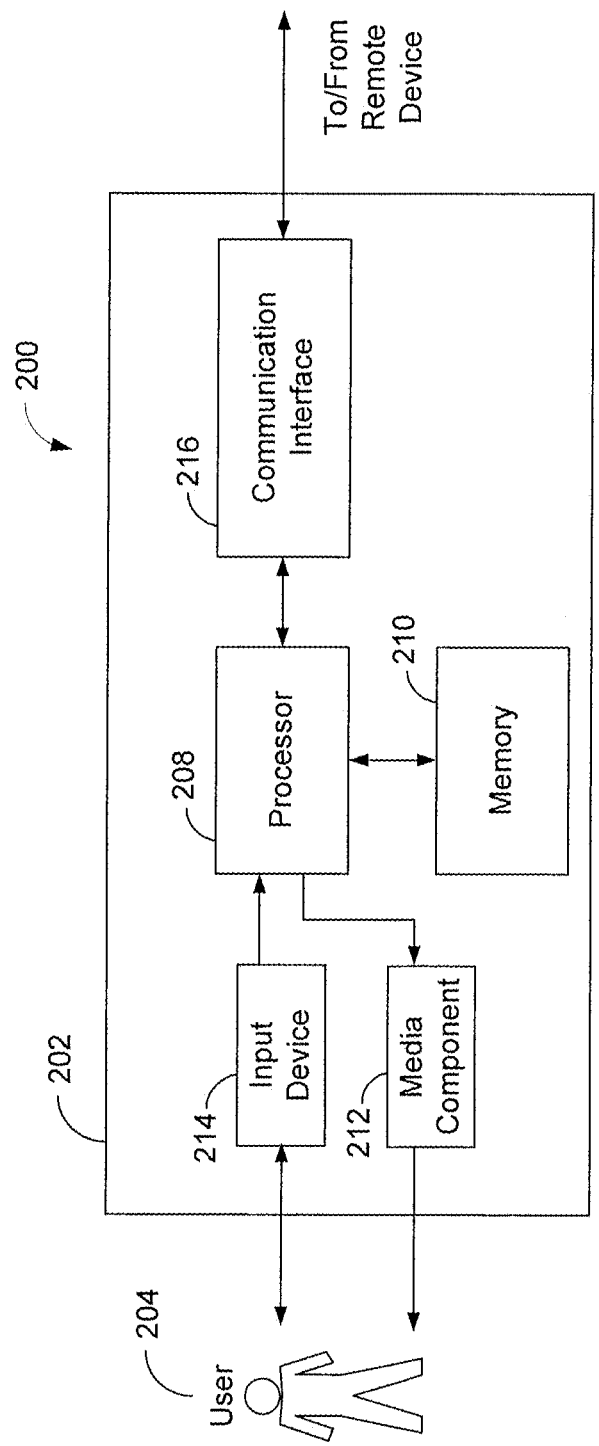
FIG. 2 illustrates an exemplary configuration of an exemplary user computing device that may be used in the smart waste bin computer system illustrated in FIG. 1.

FIG. 2 illustrates an exemplary configuration 200 of an exemplary user computing device 202. In some embodiments, user computing device 202 may be in communication with a smart waste bin computing device (such as smart waste bin computing device 102). User computing device 202 may be representative of, but is not limited to, user computing devices 110 or a user interface device of smart waste bin 106. For example, user computing device 202 may be a mobile device, smartphone, tablet, smartwatch, wearable electronic, laptop, desktop, or another type of computing device associated with a user and/or account holder.

User computer device 202 may be operated by a user 204. User computer device 202 may receive input from user 204 via an input device 214. User computer device 202 includes a processor 208 for executing instructions. In some embodiments, executable instructions may be stored in a memory area 210. Processor 208 may include one or more processing units (e.g., in a multi-core configuration). Memory area 210 may be any device allowing information such as executable instructions and/or user and registration data to be stored and retrieved. Memory area 210 may include one or more computer-readable media.

User computer device 202 also may include at least one media output component 212 for presenting information to user 204. Media output component 212 may be any component capable of conveying information to user 204 and may be used to at least partially implement the user interface of smart waste bin 106 and/or a smart waste bin application on user computer device 202 associated with smart waste bin computing device 102. In some embodiments, media output component 212 may include an output adapter (not shown), such as a video adapter and/or an audio adapter. An output adapter may be operatively coupled to processor 208 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones).

In some embodiments, media output component 212 may be configured to present a graphical user interface (e.g., a web browser and/or a client application) to user 204. A graphical user interface may include, for example, prompts for user 204 input.

In some embodiments, user computer device 202 may include input device 214 for receiving input from user 204. User 204 may use input device 214 to, without limitation, interact with and/or locate smart waste bin 106 (shown in FIG. 1). Input device 214 may include, for example, a keyboard, a pointing device, a mouse, a stylus, and/or a touch sensitive panel (e.g., a touch pad or a touch screen) and may be used to at least partially implement the user interface of smart waste bin 106. For example, a single component, such as a touch screen, may function as both an output device of media output component 212 and input device 214. User computer device 202 may further include at least one sensor, including, for example, a gyroscope, an accelerometer, a position detector, a biometric input device, and/or an audio input device. In some embodiments, at least some data collected by user computer device 202 may be transmitted to smart waste bin computing device 102.

User computer device 202 may also include a communication interface 216, communicatively coupled to any of smart waste bin computing device 102 and user computing device 110. Communication interface 216 may include, for example, a wired or wireless network adapter and/or a wireless data transceiver for use with a mobile telecommunications network.

Stored in memory area 210 may be, for example, computer-readable instructions for providing a user interface to user 204 via media output component 212 and, optionally, receiving and processing input from input device 214. The user interface may include, among other possibilities, a web browser and/or a client application. Web browsers enable users, such as user 204, to display and interact with media and other information typically embedded on a web page or a website hosted by smart waste bin computing device 102 and/or user computing device 110. A client application may allow user 204 to interact with, for example, smart waste bin computing device 102. For example, instructions may be stored by a cloud service and the output of the execution of the instructions sent to the media output component 212. User computing device 202 may include additional, less, or alternate functionality, including that discussed elsewhere herein.

Exemplary Server Device

Figure 3:
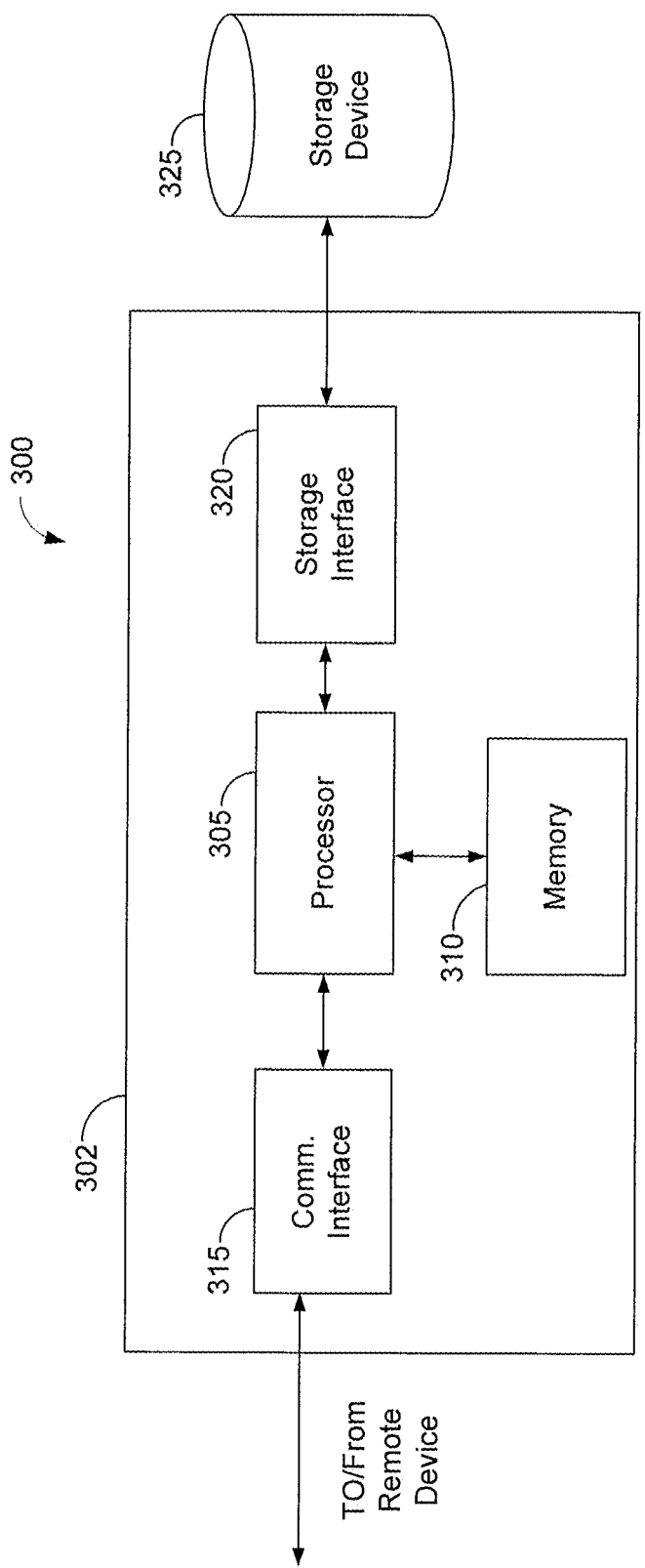
FIG. 3 illustrates an exemplary configuration of an exemplary server computing device that may be used in the smart waste bin computer system illustrated in FIG. 1.

FIG. 3 depicts an exemplary configuration 300 of an exemplary server computing device 302, in accordance with one embodiment of the present disclosure. Server computer device 302 may include, but is not limited to, smart waste bin computing device 102 (shown in FIG. 1). Server computer device 302 may include a processor 305 for executing instructions. Instructions may be stored in a memory area 310. Processor 305 may include one or more processing units (e.g., in a multi-core configuration).

Processor 305 may be operatively coupled to a communication interface 315 such that server computer device 302 may be capable of communicating with a remote device such as another server computer device 302 or a user computing device, such as user computing device 110

(shown in FIG. 1). For example, communication interface 315 may receive requests from or transmit requests to user computing device 110 via the Internet.

Processor 305 may also be operatively coupled to a storage device 325. Storage device 325 may be any computer-operated hardware suitable for storing and/or retrieving data, such as, but not limited to, data associated with database 104 (shown in FIG. 1). In some embodiments, storage device 325 may be integrated in server computer device 302. For example, server computer device 302 may include one or more hard disk drives as storage device 325. In other embodiments, storage device 325 may be external to server computer device 302 and may be accessed by a plurality of server computer devices 302. For example, storage device 325 may include a storage area network (SAN), a network attached storage (NAS) system, and/or multiple storage units such as hard disks and/or solid-state disks in a redundant array of inexpensive disks (RAID) configuration.

In some embodiments, processor 305 may be operatively coupled to storage device 325 via a storage interface 320. Storage interface 320 may be any component capable of providing processor 305 with access to storage device 325. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 320.

Processor 305 executes computer-executable instructions for implementing aspects of the disclosure. In some embodiments, processor 305 may be transformed into a special purpose microprocessor by executing computer-executable instructions or by otherwise being programmed.

Figure 4:
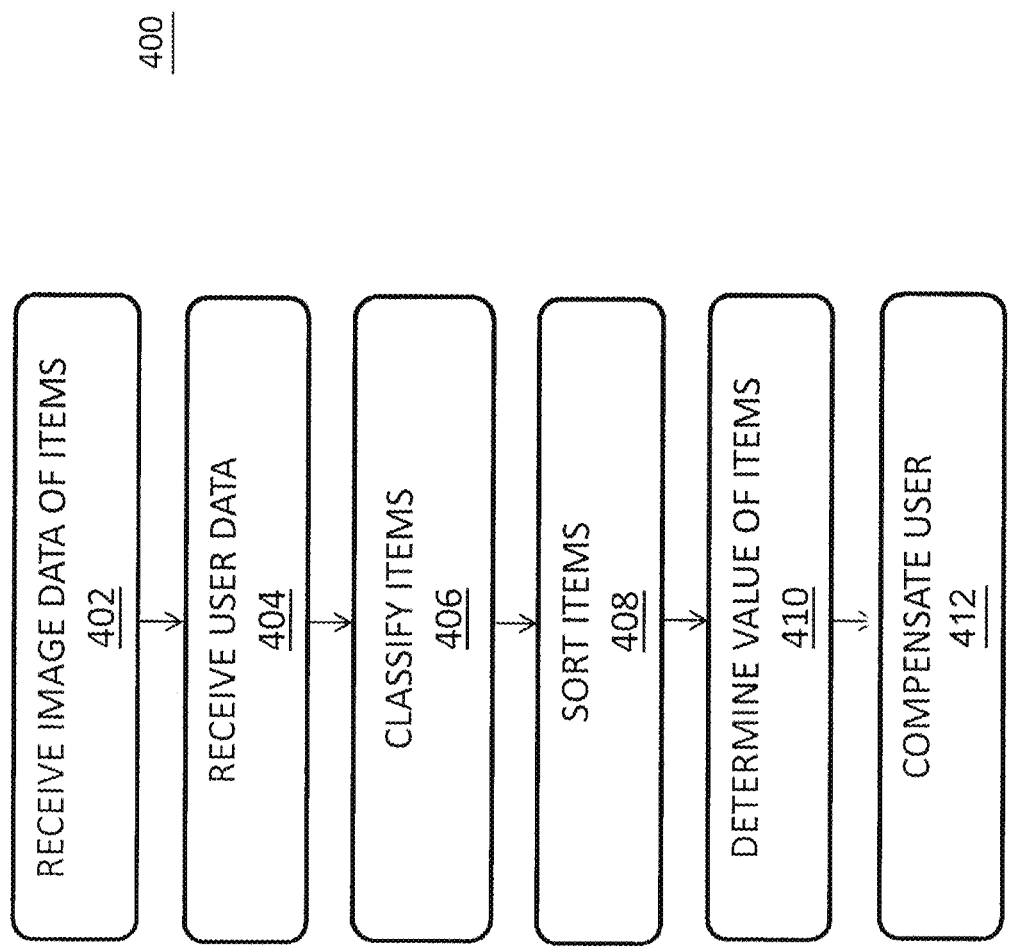
FIG. 4 illustrates a flow chart of an exemplary computer-implemented method implemented by the exemplary smart waste bin computer system shown in FIG. 1.

Examples of Processes for Waste Management Categorization and Financial Reimbursement FIG. 4 illustrates a simplified flow chart of an exemplary computer-implemented process 400 for waste management categorization and financial reimbursement. Process 400 may be implemented by a computing device, such as smart waste bin computing device 102 (shown in FIG. 1). In an exemplary embodiment, smart waste bin computing device 102 may be in communication with user computing device 110 (shown in FIG. 1). Even further, smart waste bin computing device 102 may be a part of or communicatively coupled to smart waste bin 106 (shown in FIG. 1).

In the exemplary embodiment, smart waste bin computing device may receive 402 image data pertaining to one or more trashed items inserted into deposit container 118 of smart waste bin 106 (shown in FIG. 1). The image data may be captured by one or more cameras, such as cameras 108 and/or user camera 112, shown in FIG. 1. Further, received 402 image data may be received from the cameras pertaining to a user. In some embodiments, user image data may be an image of the user's actual face or other body part, like a finger print or some other biometric data. Alternatively, the user image may be an identifying code, such as a bar code or the like, that may anonymously identify user. The image data may be received 402 in response to the detection of a trashed item being placed within deposit container 118 and/or if motion is detected by a motion detector. In another embodiment, image data may be received 402 in response to a user action (e.g., a button press, user interface interaction, etc.). Process 400 further includes receiving 404 user data (e.g. and authenticating a user). Different authentication techniques may be used by smart waste bin computing device 102 in communication with at least one database, such as database 104, shown in FIG. 1. For example, facial recognition, thumbprint recognition, or authentication based upon biometrics data may be performed. Database 104 may store user accounts which include user account information. User account information may include, but is not limited to, user name, address, phone number, bank account information, cryptocurrency wallet information, online payment information, payment preferences, or the like. If the user wishes to remain anonymous, the user may simply enter an identifying code that would link the user to a certain account, for example a cryptocurrency account. This account number may be subsequently utilized by smart waste bin computing device 102 for the payout of financial compensation.

In the exemplary embodiment, process 400 includes classifying 406 the trashed items using the image data pertaining to the trashed items presented as refuse by the user. As described herein, the image data may be a 3-D image model or the like. Classification 406 may be performed in part by image comparison methods of prior identified materials. The information of prior-identified materials may be stored in a database for access, such as database 104. Classification 406 may take into consideration a myriad of factors, such as weight, mass, and volume of the presented item for disposal. Process 400 further includes sorting 408 the trashed items based upon the classification 406 of the trashed items.

Process 400 may further include determining 410 a value of the trashed items. Smart waste bin computing device 102 may use regression and stored market and social values associated with the trashed item to determine 410 the value of the trashed item.

In the exemplary embodiment, process 400 may further include compensating 412 a user for the trashed item. Smart waste bin computing device 102 may provide financial compensation to a user that presented the item for disposal. Payment may be made to a user in a predetermined method or based upon a user's preference. For example, payment may be made in cash to the user, via one or more different types of digital payment systems, such as PayPal or Venmo, or the like, or via one or more cryptocurrency methods utilizing blockchain technology, such as via bitcoin or ethereum. It is understood that the payment methods set forth herein are in no way meant to be limiting.

Figure 5:
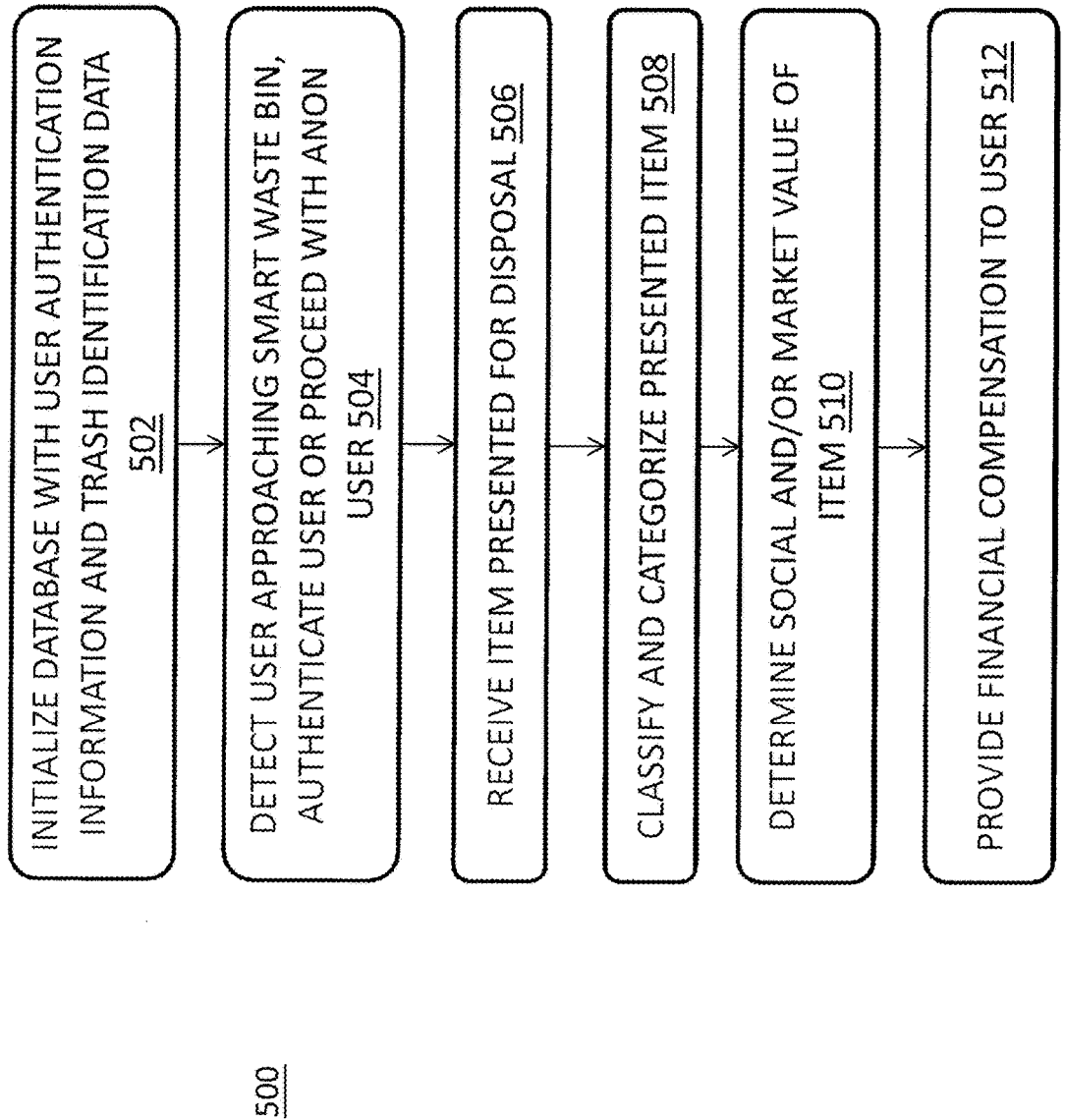
FIG. 5 illustrates another flow chart of an exemplary computer-implemented method implemented by the exemplary smart waste bin computer system shown in FIG. 1.

FIG. 5 illustrates an exemplary process 500 for waste management database initialization, categorization, sorting, and financial reimbursement. Process 500 may be implemented by a computing device, such as smart waste bin computing device 102, shown in FIG. 1. In an exemplary embodiment, smart waste bin computing device 102 may be in communication with user computing device 110. Even further, smart waste bin computing device 102 may be a part of or communicatively-coupled to smart waste bin 106 (shown in FIG. 1).

In the exemplary process, smart waste bin computing device 102 may have a database, such as database 104 of FIG. 1, initialized 502 with user account information and item identification data, along with other information vital to the operation and usage of the system disclosed. User account information may include, but is not limited to, username, password credentials, real name, address, phone no., device ID, payment account information, historical data, or the like. The database may also include item identification data utilized to identify items presented for disposal by one or more users of the system.

Database 104 may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Database 104 may also be trained by human feedback. Image verification or identification processes may be utilized to build a database used by smart waste bin 106 during item identification. Different models may be created, such as two-dimensional models and three-dimensional models.

In the exemplary embodiment, smart waste bin computing device 102 may detect 504 an approaching user. In one embodiment, one or more sensors may detect a user approaching the device with a trashed item for disposal. Upon detection of a user being in proximity of smart waste bin computing device 102, user authentication and verification steps may be performed. In one embodiment, pictures of the user may be taken, such as pictures of the user's face. In another embodiment, a sensor may receive fingerprint data or other biometrics (e.g., retina scan, handprint identification). In some embodiments, user identifying information may be transmitted wirelessly from the user's device 110 to smart waste bin computing device 102. Based upon user information stored in database 104, the user may be authenticated and recognized by smart waste bin computing device 102. The database 104 may store user accounts which include user account information. User account information may include, but is not limited to, user name, address, phone number, bank account information, cryptocurrency wallet information, online payment information, or the like. If the user wishes to remain anonymous, the user may simply enter an identifying code that would link the user to a certain account, for example a cryptocurrency account. This account number may be subsequently utilized by the Smart waste bin computing device for the payout of financial compensation.

In some embodiments smart waste bin computing device 102 may detect a user's approach, however the user may decide not to disclose personal information and proceed as an anonymous user. In this instance, the steps to authenticate a user would not be needed. However, the user may opt to create a user account, if they so desire, to improve their experience.

The user may present a trashed item for disposal by smart waste bin 106. In some embodiments, the action of receiving an item may be first initialized by a user pressing a button, interacting with a switch, or making a selection via a user interface.

In the exemplary embodiment, smart waste bin computing device may receive 506 image data pertaining to the trashed items inserted into smart waste bin 106. The image data may be captured by one or more cameras, such as cameras 108 or a user camera 112 of a user computing device 110 (shown in FIG. 1). In some embodiments, receiving 506 may be performed in response to the detection of an item being placed within a receptacle, such as via motion detection. In another embodiment, receiving 506 may be performed in response to a user action (e.g., button press, user interface interaction, etc.).

Smart waste bin computing device 102 may classify and categorize 508 the image data pertaining to the trashed items presented as refuse by the user of the system. As described herein, the image data may be a 3-D image model or the like. Classification and categorization may be performed in part by image comparison methods of prior identified materials. The information of prior-identified materials may be stored in a database for access, such as database 104. Classification and categorization take into consideration a myriad of factors, such as weight, mass, material type, and condition of the trashed item for disposal.

Smart waste bin computing device 102 may compute 510 a value of the presented item 114 for disposal. In some embodiments, the perceived value of the presented item may be in part based upon the classification and categorization of the item. For example, different social values and market values may be placed on an item described herein. In some embodiments, an item that is perceived as reusable would have a higher value than one that is not reusable. For example, recyclable materials such as glass, plastic, or paper, would likely have a higher value than non-recyclable materials, such as Styrofoam. In other embodiments, an item having a negative social value would likely have a more rewarding financial value. Items having a negative social value would be items that pose a threat to society, for example used syringes or the like.

Smart waste bin computing device 102 may provide 512 financial compensation to a user who presented the trashed item for disposal. Financial compensation may be paid 510 to the user in an amount equal to the perceived value computed 510. Payment may be made to a user in a predetermined method or based upon a user's preference. For example, payment may be made in cash to the user, via one or more different types of digital payment systems, such as PayPal or Venmo, or the like, or via one or more cryptocurrency methods utilizing blockchain technology, such as via bitcoin or ethereum. It is understood that the payment methods set forth herein are in no way meant to be limiting. In some embodiments, payment schedules may be determined based upon a regression model. In some embodiments, a user may be given the choice to accept a financial compensation offer. If the offer is not accepted by the user, the item may be returned to the user. In some embodiments, the user may choose to simply not accept an offer or any offers and just choose to dispose of the item in the most expeditious manner.

It is understood that different types of solid wastes may be presented for disposal by a user to smart waste bin computing device 102 and smart waste bin 106. In at least some embodiments, the certain waste type may be at least one of recyclable material, biodegradable materials, needles, compostable material, or general trash materials. In some embodiments, the Smart waste bin computing device may prevent the insertion of non-waste, such as rocks, stones, or some other type of organic materials. For example, the item identification process would signal the can to refuse the presented item and not sort the item at all.

Examples of Sorting Mechanism of Disposal Device

Figure 6:
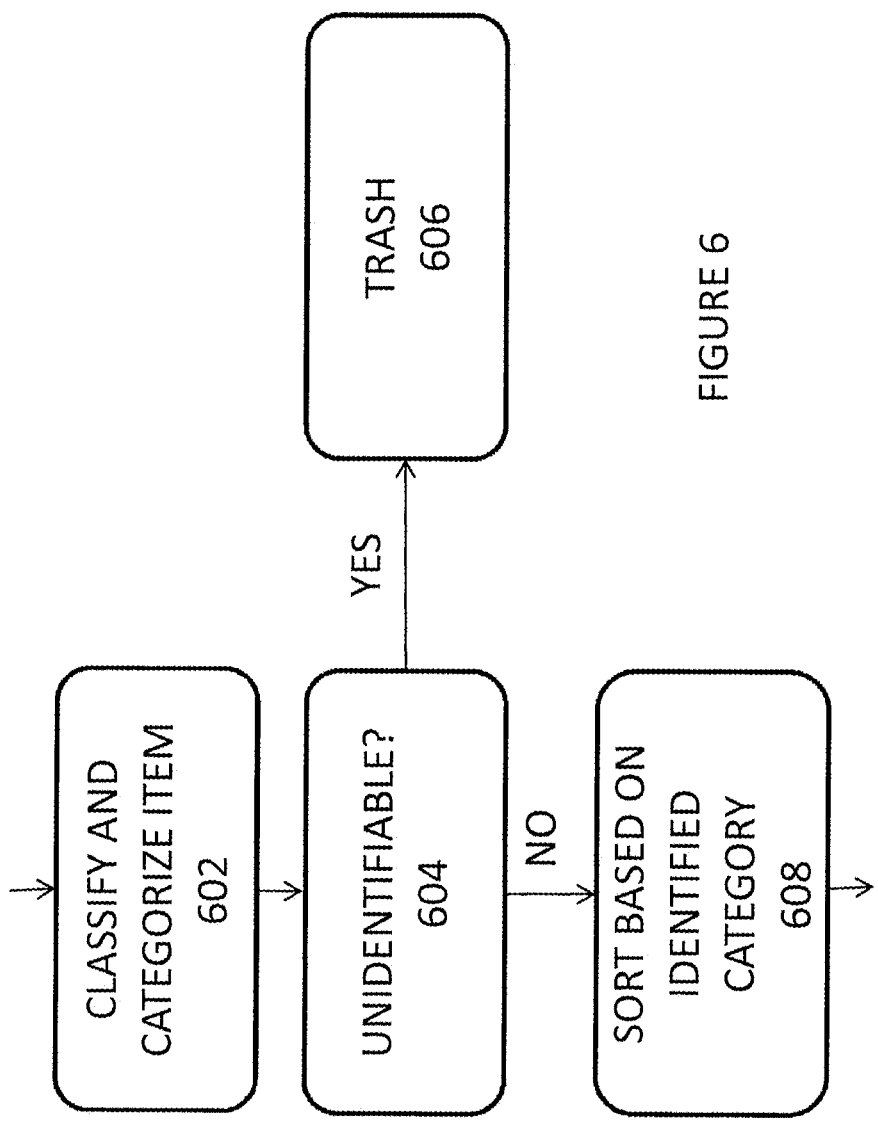
FIG. 6 illustrates another flow chart of an exemplary computer-implemented method implemented by the exemplary smart waste bin computer system shown in FIG. 1.

FIG. 6 illustrates another flow chart of an exemplary computer-implemented method implemented by the exemplary smart waste bin computer system shown in FIG. 1. As shown in FIG. 6, smart waste bin computing device 102 (shown in FIG. 1) may include a sorting mechanism for sorting of presented items for disposal. Smart waste bin 106 (shown in FIG. 1), in line with the disclosed embodiments set forth herein, may implement various techniques to properly sort items into the correct bins. For example, recyclable materials should be sorted into a recyclable bin, compost materials should be sorted into a compost bin, etc. As shown in FIG. 6, a workflow diagram 600 may be implemented by computing device 102 and smart can 106 to properly sort items. At step 602, classified/categorized items may be considered ready for sorting. At step 604, computing device 102 may determine that the item was not identifiable by the item identification process. In this instance, the item may be disposed of with regular trash at step 606. In some embodiments, if the item was identified as being of a certain type, the item may be sorted accordingly based upon classification/categorization 608. It is understood that smart waste bin 106 is not limited to a certain amount of bins. While some waste cans may only have a couple bins available for sorting, such as one for commingled recyclables and one for general waste, others may have a plurality of bins capable of handling many different types of waste, such as a bin for biohazard materials, a bin for commingled recyclables, a bin for compost, a bin for general waste, or combinations thereof.

Exemplary Computer Device

Figure 7:
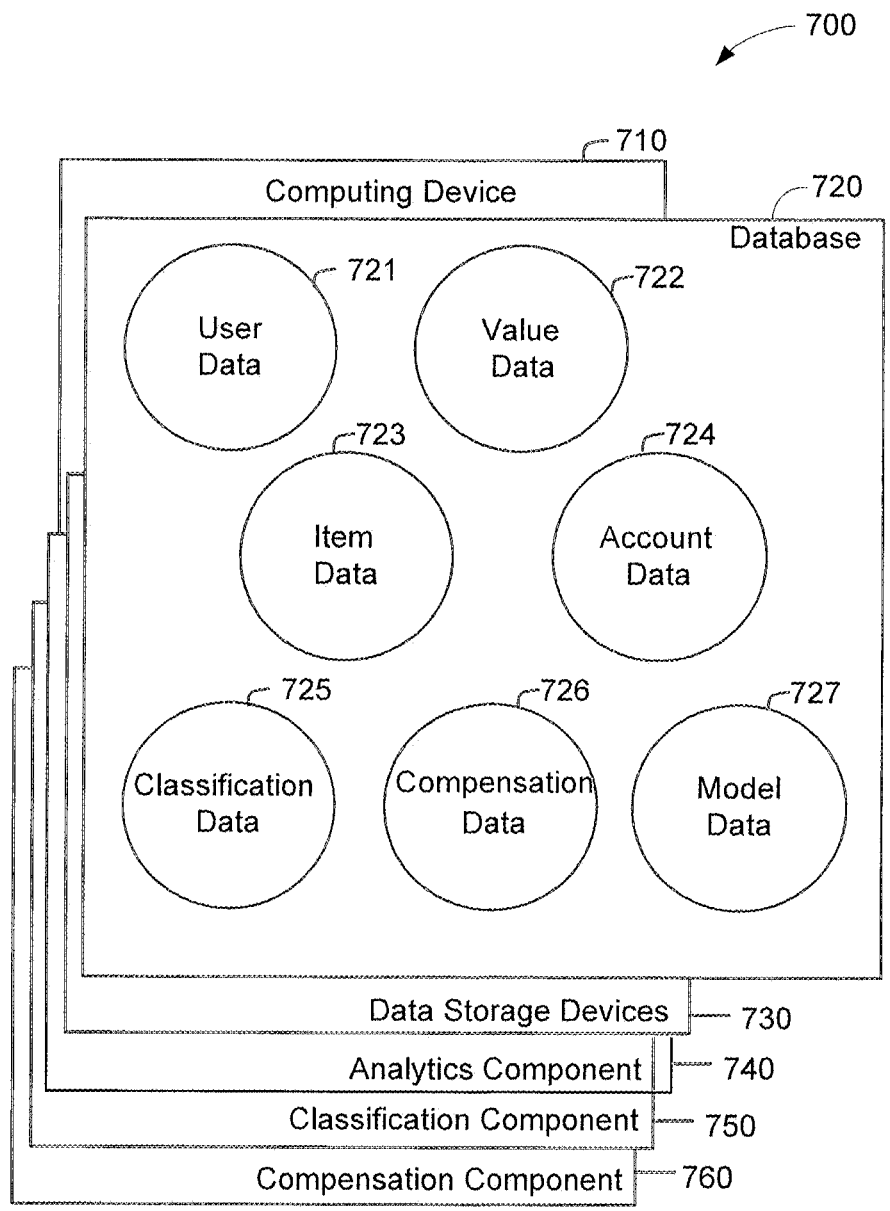
FIG. 7 illustrates a diagram of components of one or more exemplary computing devices that may be used in the smart waste bin computer system shown in FIG. 1.

FIG. 7 depicts a diagram 700 of components of one or more exemplary computing devices 710 that may be used in smart waste bin system 100 (shown in FIG. 1). In some embodiments, computing device 710 may be similar to smart waste bin computing device 102 (shown in FIG. 1). Database 720 may be coupled with several separate components within computing device 710, which perform specific tasks. In this embodiment, database 720 may include user data 721, value data 722, item data 723, account data 724, classification data 725, compensation data 726, and model data 727. In some embodiments, database 720 may be similar to database 104 (shown in FIG. 1).

Computing device 710 may include database 720, as well as data storage devices 730. Computing device 710 may also include an analytics component 740 for analyzing image data and/or user data. Computing device 710 may further include classification component 750 for classifying trashed items. Moreover, computing device 710 may include compensation component 760 for compensating users based upon the deposited trashed items. Computing devices 710 may include additional, less, or alternate functionality, including that discussed elsewhere herein.

Examples of Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image or video data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning.

In supervised machine learning, a processing element may be provided with example inputs and their associated outputs, and may seek to discover a general rule that maps inputs to outputs, so that when subsequent novel inputs are provided the processing element may based upon the discovered rule, accurately predict the correct output. In unsupervised machine learning, the processing element may be needed to find its own structure in unlabeled example inputs. In one embodiment, machine learning techniques may be used to extract data about the presented item for disposal, the user presenting the item for disposal, and/or other data.

Based upon these analyses, the processing element may learn how to identify characteristics and patterns that may then be applied to analyzing sensor data, authentication data, image data, mobile device data, and/or other data. For example, the processing element may learn to properly identify refuse presented for disposal. The processing element may also learn how to identify different types of refuse based upon size, weight, condition, and other factors.

EXAMPLES OF EMBODIMENTS

In one embodiment, a smart waste bin for waste management including a plurality of cameras, a deposit container, a plurality of waste receptacles, and a computing device including at least one processor in communication with at least one memory device may be provided. The at least one processor may be configured to: (i) receive image data of one or more items inserted into the deposit container by a user, the image data captured by at least one camera of the plurality of cameras, (ii) receive user data associated with the user, (iii) classify the one or more items based upon the image data, (iv) sort the one or more items into the corresponding waste receptacle of the plurality of waste receptacles based upon the classification, (v) determine an assigned value of the one or more items based upon the classification, and (vi) compensate the user based upon the assigned value of the one or more items. The smart waste bin may include additional, less, or alternate functionality, including that discussed elsewhere herein.

In some embodiments, the processor of the smart waste bin may further be configured to: (i) classify the one or more items as a waste type based upon the image data using convolutional recurrent neural network using binary classification, wherein the waste type includes one of recyclable material, biodegradable material, compostable material, and general trash material, (ii) utilize regression analysis to determine the assigned value of the one or more items based upon at least one of social value and market value, (iii) identify the user based upon the received user data, (iv) determine that the identified user has an account associated with and stored by the smart waste bin, wherein the account includes account information, and wherein the account information includes at least one of user preferences for compensation, a financial account number, and a cryptocurrency identification number, (v) automatically compensate the user for the deposited one or more items based upon the account information, and (vi) create, based upon the received image data of the one or more items, a 3-D computer image of the one or more items. Further, the compensation may be at least one of cash, digital payment, and cryptocurrency payment.

In another embodiment, a method for waste management carried out via a smart waste bin, the smart waste bin including a plurality of cameras, a plurality of waste receptacles, and a deposit container, may be provided. The method may include: (i) receiving image data of one or more items inserted into the deposit container by a user, the image data captured by at least one camera of the plurality of cameras, (ii) receiving user data associated with the user, (iii) classifying the one or more items based upon the image data, (iv) sorting the one or more items into the corresponding waste receptacle of the plurality of waste receptacles based upon the classification, (v) determining an assigned value of the one or more items based upon the classification, and (vi) compensating the user based upon the assigned value of the one or more items. The method may include additional, less, or alternate actions, including that discussed elsewhere herein.

In another embodiment, at least one non-transitory computer-readable media having computer-executable instructions thereon, wherein when executed by at least one processor of a computer system of a smart waste bin including a plurality of cameras, a deposit container, and a plurality of receptacles, cause the at least one processor to: (i) receive image data of one or more items inserted into the deposit container by a user, the image data captured by at least one camera of the plurality of cameras, (ii) receive user data associated with the user, (iii) classify the one or more items based upon the image data, (iv) sort the one or more items into the corresponding waste receptacle of the plurality of waste receptacles based upon the classification, (v) determine an assigned value of the one or more items based upon the classification, and (vi) compensate the user based upon the assigned value of the one or more items. The instructions may direct additional, less, or alternate functionality, including that discussed elsewhere herein.

EXAMPLES OF ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program may be provided, and the program is embodied on a computer readable medium. In an example embodiment, the system may be executed on a single computer system, without requiring a connection to a sever computer. In a further embodiment, the system may run in a Windows® environment (Windows is a registered trademark of Microsoft Corporation, Redmond, Washington). In yet another embodiment, the system may run on a mainframe environment and a UNIX® server environment (UNIX is a registered trademark of X/Open Company Limited located in Reading, Berkshire, United Kingdom). The application may be flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process may be practiced independent and separate from other components and processes described herein. Each component and process may also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. An apparatus comprising:
   one or more cameras;
   a deposit region;
   one or more processors; and
   one or more non-transitory computer-readable media storing computing instructions that, when executed on the one or more processors, cause the one or more processors to perform operations comprising:
      receiving image data of one or more items inserted into the deposit region by a user, the image data captured by the one or more cameras when the one or more items are in the deposit region;
      classifying the one or more items as one or more types based at least on the image data;
      determining a compensation offer based at least on the one or more types of the one or more items;
      presenting the compensation offer to the user;
      when the user accepts the compensation offer, compensating the user according to the compensation offer; and
      when the user declines the compensation offer and chooses to dispose the one or more items, disposing the one or more items.

2. The apparatus of claim 1, wherein determining the compensation offer further comprises:
   determining one or more assigned values corresponding to the one or more items based at least on the one or more types; and
   determining the compensation offer based at least on the one or more assigned values corresponding to the one or more items.

3. The apparatus of claim 2, wherein the one or more assigned values are determined based at least on a social value or a market value.

4. The apparatus of claim 2, wherein the one or more assigned values are determined based at least on a regression analysis.

5. The apparatus of claim 1, wherein classifying the one or more items as the one or more types further comprises:
   classifying the one or more items as the one or more types based at least on the image data using a convolutional recurrent neural network.

6. The apparatus of claim 1, wherein the operations further comprise:
   receiving user identifying data; and
   identifying the user based on the user identifying data and stored user data for the user.

7. A computer-implemented method comprising:
   receiving image data of one or more items inserted into a deposit region by a user, the image data captured by one or more cameras when the one or more items are in the deposit region;
   classifying the one or more items as one or more types based at least on the image data;
   determining a compensation offer based at least on the one or more types of the one or more items;
   presenting the compensation offer to the user;
   when the user accepts the compensation offer, compensating the user according to the compensation offer; and
   when the user declines the compensation offer and chooses to dispose the one or more items, disposing the one or more items.

8. The computer-implemented method of claim 7, wherein determining the compensation offer further comprises:
   determining one or more assigned values corresponding to the one or more items based at least on the one or more types; and
   determining the compensation offer based at least on the one or more assigned values corresponding to the one or more items.

9. The computer-implemented method of claim 8, wherein the one or more assigned values are determined based at least on a social value or a market value.

10. The computer-implemented method of claim 8, wherein the one or more assigned values are determined based at least on a regression analysis.

11. The computer-implemented method of claim 7, wherein classifying the one or more items as the one or more types further comprises:
    classifying the one or more items as the one or more types based at least on the image data using a convolutional recurrent neural network.

12. The computer-implemented method of claim 7 further comprising:
    receiving user identifying data; and
    identifying the user based on the user identifying data and stored user data for the user.

13. The computer-implemented method of claim 12 further comprising:
    determining a user compensation preference for the user based on the stored user data.

14. One or more non-transitory computer-readable media comprising computing instructions that, when executed on one or more processors, cause the one or more processors to perform operations comprising:
    receiving image data of one or more items inserted into a deposit region by a user, the image data captured by one or more cameras when the one or more items are in the deposit region;
    classifying the one or more items as one or more types based at least on the image data;
    determining a compensation offer based at least on the one or more types of the one or more items;
    presenting the compensation offer to the user;
    when the user accepts the compensation offer, compensating the user according to the compensation offer; and
    when the user declines the compensation offer and chooses to dispose the one or more items, disposing the one or more items.

15. The one or more non-transitory computer-readable media of claim 14, wherein determining the compensation offer further comprises:
    determining one or more assigned values corresponding to the one or more items based at least on the one or more types; and
    determining the compensation offer based at least on the one or more assigned values corresponding to the one or more items.

16. The one or more non-transitory computer-readable media of claim 15, wherein the one or more assigned values are determined based at least on a social value or a market value.

17. The one or more non-transitory computer-readable media of claim 15, wherein the one or more assigned values are determined based at least on a regression analysis.

18. The one or more non-transitory computer-readable media of claim 14, wherein classifying the one or more items as the one or more types further comprises:

classifying the one or more items as the one or more types based at least on the image data using a convolutional recurrent neural network.

19. The one or more non-transitory computer-readable media of claim 14, wherein the operations further comprise:
receiving user identifying data;
identifying the user based on the user identifying data and stored user data for the user; and
determining a user compensation preference for the user based on the stored user data.

20. The apparatus of claim 6, wherein the operations further comprise:
determining a user compensation preference for the user based on the stored user data.

* * * * *